M. E. MOELLER

June 16, 1931. THERMOMETER TUBE AND METHOD OF MAKING THE SAME Re. 18,105

Original Filed July 5, 1928

Inventor
Max E. Moeller
By his Attorney
S. J. Cox.

Reissued June 16, 1931 Re. 18,105

UNITED STATES PATENT OFFICE

MAX E. MOELLER, OF NEW YORK, N. Y., ASSIGNOR, BY MESNE ASSIGNMENTS, TO MOELLER INSTRUMENT COMPANY, INC., OF BROOKLYN, NEW YORK, A CORPORATION OF NEW YORK

THERMOMETER TUBE AND METHOD OF MAKING THE SAME

Original No. 1,753,801, dated April 8, 1930, Serial No. 290,565, filed July 5, 1928. Application for reissue filed December 22, 1930. Serial No. 504,187.

The improvements relate to tubes for thermometers and the like and methods of making the same and have for their primary object the provision of a thermometer tube having effective means for rendering the mercury or other expansible fluid in the bore more clearly visible and more easily read in connection with the usual scale or other temperature indicator.

Heretofore thermometer stems or tubes have been provided with colored backing of different kinds for the purpose of creating a contrast between the expansible fluid in the bore and the background so as to make the column of said fluid more visible and the exact position of its top more easily and accurately discernible. Considerable difficulty, however, has been encountered in so positioning and proportioning the backing that it will register properly with the bore of the stem and the fluid therein throughout their length without making the said backing of such proportions that it will interfere with the background behind it—such as the light shield at the back of the stem—and thus lead to obscuration and confusion.

The present improvements may dispense with the background or light shield at the back of the stem and employ a non-transparent, and preferably reflective film or layer extending from the bore on either side to the periphery of the stem, or approximately thereto, throughout its reading length, leaving the bore clear, and a suitable colored backing behind said bore is then placed and made of any width necessary to provide a proper contrast for observation of the bore and the fluid column therein from any point of view at the front of the thermometer. The improvements also provide simple and efficient means for making such a stem. With the prior constructions and methods this could not always be done, owing to the necessity of making the colored backing of relatively narrow width and the liability of twisting or unduly attenuating or breaking the said backing in the drawing process. The stem provided by the present improvements is also believed to make reading of the thermometer more easy and accurate than the other stems with backing even when perfectly made.

In order to illustrate the present improvements the accompanying drawings are provided and referred to herein. In the said drawings, Fig. 1 is an end view of a mold, with a block or blank formed in accordance with the present improvements and before drawing cast therein, with the top or end cover removed to expose the end of said block;

In making the thermometer stem and according to the method of the present improvements a mold in two parts, 1 and 2, hinged together at one side as indicated at 3 and having complemental cavities $1^a$ and $2^a$, is preferably employed, each cavity being substantially semi-cylindrical in form and of sufficient size and length to mold a proper block or blank of glass. A removable metallic rod is also provided for the purpose of forming the bore in the molded block.

This mold is first opened and the cavities of both sections filled with glass in a heated, plastic state, the one cavity, preferably the lower one, being filled with colored glass and the upper one with uncolored, transparent glass. The plastic glass is then pressed, if necessary, in any suitable manner, and by any suitable means, such as are commonly used in glass molding establishments, and the rod 5 of iron or other material having a higher heat resistance than the glass and considerably longer than the mold cavity then placed on the mold section containing colored glass and pressed into the glass therein, suitable registering grooves being provided in the mold for the reception of the said rod. The cavity containing the colored glass is not quite filled, and a film or layer of non-transparent glass, such as the ordinary white or opal glass, in a plastic state, is spread over the upper surface of the glass in the cavity to form a stratum of this glass on the top surface. This layer of non-transparent glass should extend to about the middle or horizontal diameter of the rod. The mold is then closed and the two sections of the block permitted to unite to form a complete cylindrical block with bore therein corresponding to the rod. In these operations, as in the remainder of the operation, the heat of the mold rod and mold is maintained at a sufficient degree of temperature to insure that the glass is plastic throughout. The mold section cavities may also be filled slightly more than necessary to make the cylindrical block, so that when the mold is closed the glass therein will be under compression.

The colored glass referred to is indicated at 6, the uncolored glass at 7, the stratum of non-transparent glass at 8 and the bore formed by the rod at 9.

Figure 4:
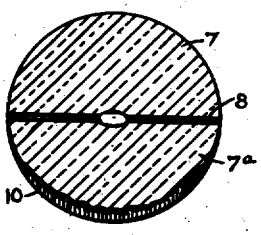
Figs. 4 and 5 are transverse sections of modified forms of the stem made in accordance with the present improvements.
Figure 5:
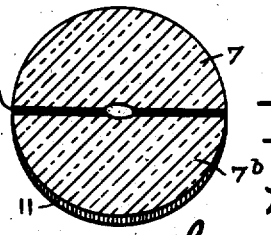

Instead of filling one-half of the mold with colored glass, it may be only partly filled, so as to provide a backing of the necessary width, or the bottom of the mold throughout all or part of its arch may have a layer or coating of colored and/or other non-transparent glass, as indicated at 10 in Fig. 4. Instead of this, a stem in accordance with the improvements may be made by molding the block entirely of uncolored glass, with the non-transparent diameteric layer and then coating the outside of it on one side with colored glass as indicated at 11 in Fig. 5, as by dipping the block in a horizontal position in a vessel containing molten colored glass.

Figure 1:
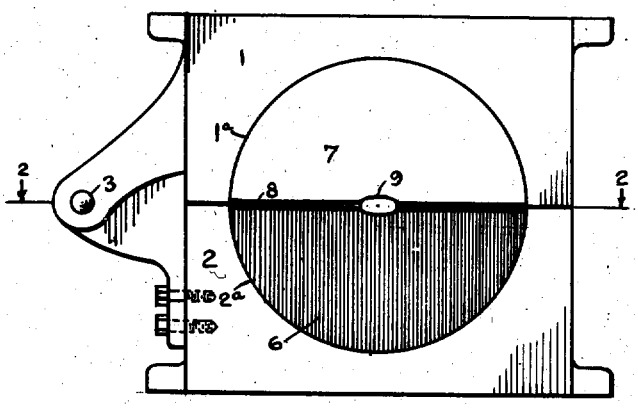
Figure 3:
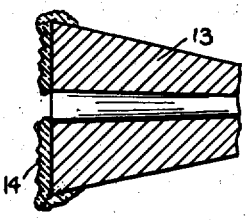
Fig. 3 is a fragment of the blow pipe showing its mouth or head in longitudinal medial section.
Figure 2:
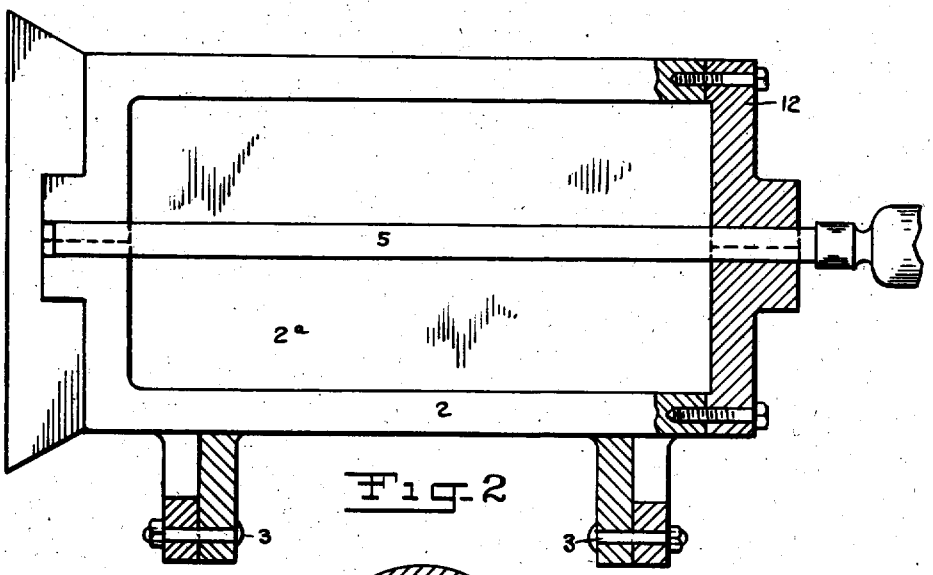
Fig. 2 is a plan of the lower half or section of the mold with the backing and non-transparent layer molded therein, as indicated by the line 2—2 and the arrow in Fig. 1, the mold in this and the first figure being shown diagrammatically for the purpose of illustrating in part the improved method.

After the described steps have been performed the cover 12 of the mold is removed, the rod 5 also removed and the head of a blow pipe, such as that indicated at 13 in Fig. 3, with plastic glass, as indicated at 14 thereon, applied to the end of the block. Preferably the rod is first removed and the two sections of the molded block permitted to unite while still hot and soft before opening the mold. The mold is stood on end when the top or cover is removed. Air pressure is maintained on the bore of the glass in the mold by means of the blow pipe while the block is drawn to the desired length to form a suitable stem, the block adhering to the surface of the blow pipe head during this operation, which is preceded by removal of the mold.

During the drawing operation the body of the glass may be drawn out to any desired extent within wide limits by dipping the glass in a pot of molten glass to increase its volume. This dipping will of course add a layer of transparent glass on the outside of the original block and beyond the non-transparent stratum at its edges, and also covering the portion of said non-transparent glass which extends around the back of the stem. This, however, will not affect the clear reading of the thermometer, as reflections from the said added layer will be intercepted by the said non-transparent stratum or film, at the middle and the back of the stem. It will be apparent also that a block or blank of glass two inches in diameter can be drawn out to make a stem one-eighth inch in diameter more than one hundred times its length. The drawing operation in the present case does not differ essentially from similar operations well known and long practiced by those skilled in the art. It will be apparent, however, from the foregoing references to the operations performed and conditions encountered that the tube as originally molded becomes greatly attenuated and that the bore and backing go through the same transformation. The bore can be kept open if necessary by means of the gas pressure from the blow pipe, and the thermometer stem can be maintained at a constant thickness and symmetrically formed by means of suitable guages and forming devices used for that purpose. During this operation the stem may also be given a magnifying edge by pressing it and working it in a V-shaped mold or form. Where, however, there is a narrow backing member between the bore and the back of the stem it is not possible to control it during the drawing operation so as to prevent it at times from twisting moving from its proper position or becoming unduly attenuated so as to render it ineffective for that purpose.

The method or process herein described, as well as the stem itself may be varied within certain limits without departing from the scope of the invention, so long as the essentials are retained. Various additions may also be made thereto. For instance, in the dipping and drawing process the non-transparent layer may be widened by adding more of the non-transparent glass at the edges of the layer, and it will not affect the character or function of this layer if these additions—or the original deposit—spread toward the front or back of the thermometer to a certain extent. Neither is it necessary that the said layer shall be diametric, so long as it is sufficient to provide a non-transparent field extending on both sides of the bore a sufficient distance to shut out the colored background from the eye focused on the bore and column of fluid therein. The molding of the blank or core before drawing it, with or without dipping it in molten glass to add thereto is however believed to be an essential of the process and to be novel in this art.

The improvements herein described are not limited in their application to the form of stem illustrated but may be employed in the production of stems of various forms to produce similar or different results. Thus one of the molded sections may be larger than the other, so as to produce a stem having an elliptical cross section, with the bore 9 and diaphragm 8 toward one end of the ellipse, so that the glass between them and the front will produce a magnifying effect even to the extent of causing the fluid column as thus magnified to apparently extend substantially from side to side of the stem and produce the visual effect of a column of approximately or exactly the same width as the stem. One of the sections may also be molded so as to produce the tapering magnifying edge, commonly used in clinical and other thermometers. It is also contemplated that the non-transparent layer or stratum may not only extend to the side edges of the stem but may extend beyond them and around the back of the stem, after the manner of the non-transparent backing now commonly used, thus completely shutting out reflections from the colored backing except through the bore. Various other uses of the improvements and modifications of the form illustrated will occur to those skilled in the art.

What I claim is:

1. A glass stem for thermometers or the like comprising a glass rod having a bore in the interior thereof and a non-transparent element therein extending from said bore toward the sides thereof.

2. A glass stem for thermometers or the like comprising a glass rod having a bore in the interior thereof and a non-transparent element therein extending from said bore to the sides thereof.

3. A glass stem for thermometers or the like comprising a glass rod having a bore in the interior thereof and a non-transparent element therein extending from said bore toward the sides thereof on both sides of the bore.

4. A glass stem for thermometers or the like comprising a glass rod having a bore in the interior thereof and a non-transparent element therein extending from the side of said bore toward the sides thereof.

5. A glass stem for thermometers or the like comprising a glass rod having a bore in the interior thereof and a non-transparent element therein extending from said bore toward the sides thereof and a non-transparent backing member behind said non-transparent element arranged to direct light rays to the bore and portions of the stem at the sides thereof, said non-transparent element being arranged to intercept said rays at the sides of the bore.

6. A glass stem for thermometers or the like comprising a glass rod having a bore in the interior thereof and a non-transparent element therein extending from said bore toward the sides thereof and a backing member of colored material behind the bore and extending laterally beyond the sides thereof.

7. A glass stem for thermometers or the like comprising a glass rod having a bore in the interior thereof and a non-transparent element therein extending from said bore toward the sides thereof and a backing member of non-transparent material behind the said non-transparent element.

8. A glass stem for thermometers and the like comprising a glass rod having a central bore, a non-transparent element therein extending from the sides of the bore to the outer sides of the stem, but not across the bore, and a backing member between the bore and the outer surface of the stem extending laterally beyond the bore and beyond the inner edges of the non-transparent element.

9. A glass stem for thermometers and the like comprising a glass rod having a central bore, a non-transparent element therein extending from the sides of the bore to the outer sides of the stem but not across the bore, a backing member between the bore and the outer surface of the stem extending laterally beyond the bore and beyond the inner edges of the non-transparent element and another backing member between the non-transparent element and the extreme outer surface of the stem and extending over the bore.

10. A glass stem for thermometers and the like comprising a glass rod having a central bore, a non-transparent element therein extending from the sides of the bore to the outer sides of the stem but not across the bore, a backing member between the bore and the outer surface of the stem extending laterally beyond the bore and beyond the inner edges of the non-transparent element and another backing member between the non-transparent element and the extreme outer surface of the stem and extending over the bore, said backing member extending to the said surface of the stem and following the contour of said surface.

11. The herein described method of making glass thermometer stems which comprises molding the stem in sections with an interior bore for the reception of expansible fluid, uniting the two sections to form a continuous tube and embedding therein a strip of non-transparent material extending laterally from the sides of the bore to the edges of the stem and also incorporating in the stem back of the bore a colored backing element.

12. The herein described method of making a glass stem for thermometers and the like which consists of molding the stem in sections with an inner longitudinal space adapted to form a bore for expansible fluid, incorporating in one of the sections a backing element extending laterally beyond said space, inserting between said sections non-transparent material extending from the bore space laterally and then uniting the said sections with the last named element between them, then drawing the blank thus formed to the desired length and thickness.

13. The herein described method of making a glass stem or tube for thermometers and the like, which consists in placing glass in a plastic state in a mold having a greater diameter than the stem or tube to be produced, so as to form a segment of a stem block or blank, placing thereon a rod of material having a higher heat resistance than the glass to form a bore, molding another segment in manner similar to the first segment and placing it on said first segment and the rod in a plastic state with the rod between the two segments, uniting the opposed surfaces of the segments to form a cylinder of glass with thick walls with the rod as a core, then removing the rod and drawing the block or blank thus formed to the desired length.

14. In the process as specified in claim 13 inserting a film or layer of non-transparent material between the opposed surfaces of the segments before uniting them.

15. The herein described method of making a glass stem or tube for thermometers and the like, which consists in placing glass in a plastic state in a mold having a greater diameter than the stem or tube to be produced, so as to form a segment of a stem block or blank, molding another segment in manner similar to the first segment and placing it on said first segment in a plastic state placing a bar of material having a higher heat resistance than the glass between the two segments, uniting the opposed surfaces of the segments to form a cylinder of glass with thick walls with the bar as a core, then removing the bar and drawing the block or blank thus formed to the desired length.

16. In the process as specified in claim 15 inserting a film or layer of non-transparent material between the opposed surfaces of the segments before uniting them.

17. A glass stem for thermometers or the like comprising a glass rod having a bore in the interior thereof, a non-transparent element therein extending from said bore toward the sides thereof, and a non-transparent element behind said bore extending laterally thereof and toward the plane of said bore.

18. The method or process of making a glass stem or tube for thermometers and the like which consists in placing glass in a plastic state in a mold having a greater diameter than the stem or tube to be produced, placing in fixed position relative to the final molded mass of glass in the interior of said mold and before completing the filling of said mold an attenuated member of material having a relatively high heat resistance and extending through the mold cavity, embedding said member in the said glass in the mold, so as to form a cylinder of glass in said mold with thick walls and with the said member as a core, then removing said member from the cylinder of glass, so as to leave a bore having substantially the size and shape of said member, then removing the said glass cylinder from the mold, and then drawing it to the desired length.

19. The method or process of making a glass stem or tube for thermometers and the like which consists in placing glass in a plastic state in a mold having a greater diameter than the stem or tube to be produced, placing in the interior of said mold and before completing the filling of said mold an attenuated member of material having a relatively high heat resistance, embedding said member in the said glass in the mold, and also embedding in said glass a strip of non-transparent material in position between said member and the outer surface of the glass, so as to form a cylinder of glass in said mold with thick walls and with the said member as a core, then removing said member from the cylinder of glass, so as to leave a bore having substantially the size and shape of said member, then removing the said glass cylinder from the mold, and then drawing it to the desired length.

20. The method of making glass tubes for thermometers and the like which consists in first molding a thick block or blank with a bore by filling a mold with plastic glass and embedding in said glass during the operation of filling the mold by inserting in said mold before filling a high heat resisting rod or bar of relatively small diameter and surrounding the same with glass after such insertion, then removing the bar, and then removing the block or blank thus formed and drawing it and the bore therein to the desired length and attenuation.

Witness my hand this 19th day of December, 1930, county of New York, State of New York.

MAX E. MOELLER.